Patented May 15, 1928.

1,669,557

UNITED STATES PATENT OFFICE.

HERBERT JOSEPH GRAINGE AND SIDNEY WILLIAM WILDING, OF LONDON, ENGLAND, ASSIGNORS TO THE AMALGAMATED DENTAL COMPANY LIMITED, OF LONDON, ENGLAND, A BRITISH COMPANY.

MANUFACTURE OF ARTIFICIAL TEETH.

No Drawing. Application filed June 12, 1926, Serial No. 115,680, and in Great Britain June 27, 1925.

This invention consists in improvements in or relating to the manufacture of artificial teeth and refers particularly to the application of a gum facing to a denture.

There is a certain class of gum facing which is sometimes termed a synthetic enamel and which is exemplified by a condensation product of phenol and formaldehyde. Such a gum facing has the advantage that it is translucent and resembles the natural or human gum to a remarkable extent and much more effectively than does the ordinary pink gum rubber which is usually employed. These synthetic enamels or like gum facings are applied to the denture after the latter is formed and require to be moulded under heat and pressure in situ. Generally, for this purpose the denture and the gum facing are together invested in plaster of Paris contained in a flask which is then submitted to a heating operation under superatmospheric pressure.

It has already been found that during the heating operation moisture which is evolved from the plaster adversely affects the gum facing material and in order to overcome this drawback it has hitherto been proposed to paint a liquid or pasty coating over the material of the gum facing so as to protect it. Such a liquid coating or pasty coating has generally been formed of oil containing a mineral filler such as chalk; but such coatings are not altogether satisfactory in that they do not always, unless extreme care is taken, produce an impervious coating over the whole of the gum facing. Even when the greatest care is employed, such coatings have been found to fail inasmuch as they themselves are not absolutely impervious to the penetration of moisture.

This drawback is overcome by the present invention according to which the gum facing is covered by sheet material which is of a homogeneous nature and is impervious to moisture.

Conveniently the material is such that it will stick to or may be stuck on to the gum facing or some other part of the denture to which the gum facing is to be applied so as completely to enclose the latter prior to investment in the plaster.

Preferably the sheet material is formed of rubber or a rubber composition such as rubber admixed with wax or oil or other rubber-softening material.

The invention consists not only in the protective coating itself but also in the process for the application of a gum facing in preparation of an artificial denture in which the coating is employed.

In one example of the invention raw rubber is masticated on rolls with approximately 20% of paraffin wax or oil which will have the effect of softening the rubber in the resultant sheet into which the mixture is formed. The sheet thus obtained is found to be impervious to the passage through it of moisture and it may be readily applied to the gum facing. The nature of the rubber is such that by the application of slight heat it may be made to stick closely to the material of the gum facing or an adhesive solution may be employed if necessary. Generally this will not be the case.

The sheet material having the composition above described is capable of withstanding the heat to which it is necessary to subject the gum facing material of the kind above referred to in order to form it on the denture. That is to say, a temperature of from 250° to 315° F. is usually found to be necessary to harden the gum facing. The protective sheet material above described will withstand this temperature without losing its protective capacity.

It is to be understood that the invention is not limited to the particular composition described, nor is it limited in its application to gum facings composed of the condensation product above referred to. It may be usefully employed with any gum facing which, for this hardening process requires an impervious protective coating to prevent deterioration of it by the moisture from the plaster in which it is invested.

As an example of a modification of the present invention the covering sheet which is to be of a homogenous nature and impervious to moisture may comprise a sheet of tin foil or other metallic foil to one or both sides of which is applied a layer of a protective paste of a composition similar, for example, to that ordinarily employed. It is convenient to make the paste thicker than that which is usually painted on to the gum facings.

It is found also that this form of the invention is preferred to that first described because even with rubber or rubber composition fine interstices sometimes occur in the thickness of the covering strip which mitigates against the imperviousness of such materials to the passage of moisture through them. If the rubber or rubber composition is backed with tin or other metal foil, or is applied to both sides of the sheet of metal foil, the protective quality of the composite covering is better than the quality of the rubber or rubber composition by itself.

We claim:—

1. In the manufacture of an artificial denture, the steps of applying to the denture a gum facing composed of material of the kind described that is adversely affected by moisture evolved from the investing material, covering the gum facing with sheet material which is homogeneous and is impervious to moisture and subsequently investing the denture with the applied gum facing and its covering in readiness for the hardening step.

2. In the manufacture of an artificial denture, the steps of applying to the denture a gum facing composed of material of the kind described that is adversely affected by moisture evolved from the investing material, covering the gum facing with sheet material comprising metal foil having applied to at least one face of it a layer of paste, said sheet material being impervious to moisture and subsequently investing the denture with the applied gum facing and its covering in readiness for the hardening step.

3. In the manufacture of an artificial denture, the steps of applying to the denture a gum facing composed of material of the kind described that is adversely affected by moisture evolved from the investing material covering the gum facing with sheet material comprising metal foil having a layer of paste applied to both faces of it, said sheet material being impervious to moisture and subsequently investing the denture with the applied gum facing and its covering in readiness for the hardening step.

4. In the manufacture of an artificial denture, the steps of applying to the denture a gum facing composed of material of the kind described that is adversely affected by moisture evolved from the investing material, covering the gum facing with sheet material comprising metal foil to at least one face of it a paste that is ordinarily employed for protecting gum enamels during the hardening process, said sheet material being impervious to moisture and subsequently investing the denture with the applied gum facing and its covering in readiness for the hardening step.

5. In the manufacture of an artificial denture, the steps of applying to the denture a gum facing composed of material of the kind described that is adversely affected by moisture evolved from the investing material, covering the gum facing with sheet material comprising metal foil having applied to at least one face of it a paste consisting of oil containing a mineral filler, said sheet material being impervious to moisture and subsequently investing the denture with the applied gum facing and its covering in readiness for the hardening step.

6. A protective layer for covering a gum facing of the kind described before the latter is subjected to a hardening process, said protective layer comprising a sheet of metal foil having applied to at least one face of it a paste consisting of oil containing a mineral filler.

In testimony whereof we have signed our names to this specification.

HERBERT JOSEPH GRAINGE.
SIDNEY WILLIAM WILDING.